Nov. 11, 1969   H. ANDERSSON   3,477,573
APPARATUS FOR SCREENING BULK MATERIAL
Filed April 18, 1967   2 Sheets-Sheet 1
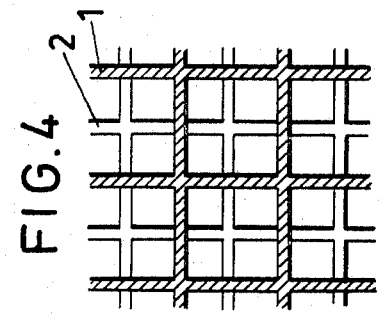
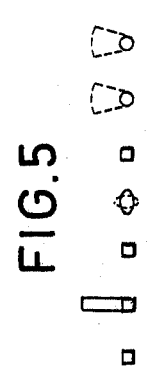
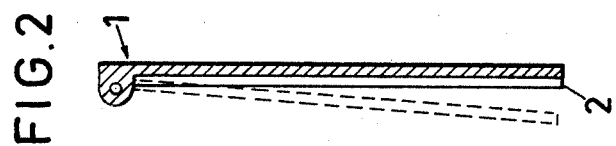
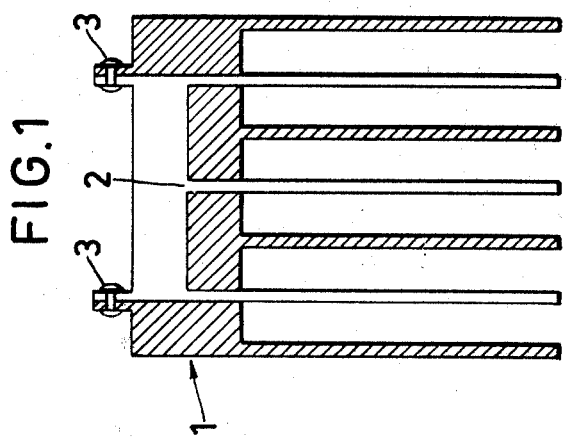
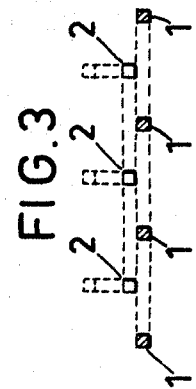
Inventor
Hugo Andersson
by Sommers + Young
Attorneys

United States Patent Office 3,477,573
Patented Nov. 11, 1969

3,477,573
APPARATUS FOR SCREENING BULK MATERIAL
Hugo Andersson, 5 Bondevagen, Storuman, Sweden
Filed Apr. 18, 1967, Ser. No. 631,838
Int. Cl. B07b 1/28
U.S. Cl. 209—260                                 5 Claims

ABSTRACT OF THE DISCLOSURE

Apparatus for loading and screening bulk materials, such as stones and the like, which includes a bucket which may be moved from a horizontal transport position to a vertical dumping position, a pair of grating members having alternating ribs or the like which form a substantially plane screen in the bottom of the bucket and link means connecting the first and second grating members to one another so that the screens are not displaced when in the horizontal position but separate to clean the screens when the bucket is in its vertical dumping position.

---

This invention relates to an arrangement at loaders or the like for sorting out, transporting away and tipping bulk material, preferably large stones from road material.

The sorting out of stones of undue size from road material is in most cases expensive and troublesome, particularly when the percentage of stones is high and the volume of the work too small for economically justifying the employment of a sorting machine. The method of sorting out by a screen (so-called riddle) above the lorry platform while simultaneously loading, is utilized to a great extent, but it involves difficulties and trouble and, moreover, the loading capacity is in many cases insufficient. A screen of this type must be mounted on a sufficiently high stand above a lorry platform, and special care must be taken that the lorry fairly unimpeded can drive astern below said stand and between its carrying posts. It is necessary that the screen is mounted inclined so that over-dimensioned stones can slide or roll off. This requires increased loading height for the loader and in many cases the arrangement of provisional loading ramps. Movements are made difficult. Stones are jammed between the fixed bars in the screen and necessitate at times interruption of the operation for cleaning. Stones falling down from the screen in the immediate vicinity of the loading place can prove difficult to keep within a limited area and they tend to impede the traffic, so that in many cases they must be removed by special transports.

The drawback of high loading heights is eliminated by the invention defined in the following claims, because the loading can be made on a plane screen. Moreover, the inflexibility of stationary mounted screens is overcome. One and the same machine ensures that the screen is in the place where it preferably has to be for smooth loading, and transports away residual material on the screen after the sorting to a place suitable for tipping. All this contributes to a high working capacity and work satisfaction. The application range of loaders, tractors and excavators is enlarged by the bucket according to the invention and at the same time the production and working capacity is promoted.

An advantageous embodiment of the arrangement is described in a greater detail in the following, with reference to the accompanying drawing whereon FIGS. 1 and 2 show the bottom of the bucket seen from above and from the side, FIG. 3 shows the fixed and movable groups of pins in the screen seen from the free end.

FIG. 4 shows a variation with a checkered grating, and

FIG. 5 shows how the movable group of pins can change position by parallel displacement in slots or by turning. In this figure also the V-shaped recesses are indicated in which the movable groups of pins or cross pins can be applied.

Figure 6:
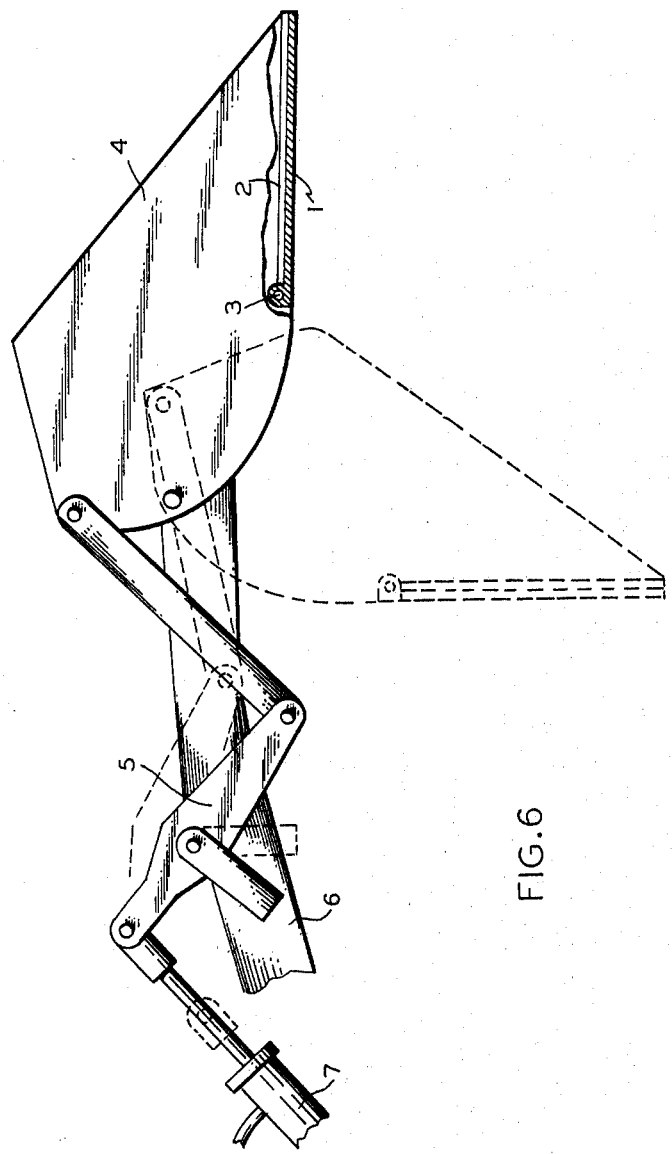
FIG. 6 shows a loading bucket and dumping means, including the screen of the present invention.

The bottom of the bucket is designed as a substantially plane screen 1, 2 with a grating of pins and cross-pins or the like, including a group of pins or cross-pins 2 which are movable for facilitating the sorting, cleaning and/or tipping operations. The screen according to the embodiment shown comprises two portions 1, 2 connected with each other by two hinged links.

FIG. 6 shows the screen 1, 2, 3 mounted in the bottom of bucket 4 which is attached to a support arm 6. Support arm 6 would, in turn, be attached to an appropriate tractor or other vehicle (not shown). Link means 5 is mounted on arm 6 and connects bucket 4 with hydraulic operating cylinder 7.

The pins of said portions are offset relative to one another by about half a division when the screen portions are substantially flush with each other. In another embodiment the group of pins provided between the fixed pins can be mounted rotatable and with a longitudinal cross-section. The screen can also be constructed to comprise a group of fixed pins and a group of pins adapted to be displaced in parallel in slots substantially perpendicular to the screen plane. The bucket can suitably be made open on the side or sides intended for tipping. In the embodiment shown the screen can be provided on its lower surface with transverse support beams wherein V-shaped recesses for the movable groups of pins or cross-pins are arranged.

The arrangement is applied as follows. By means of the operation device of a loader the bucket is placed in the desired position for being loaded with unsorted material from another machine. During the loading operation material which is less coarse passes through the screen while coarser material remains on the screen. The loading and sorting is continued until the screen is considered suitable to be unloaded and cleaned. For this purpose the bucket is turned away, driven to a suitable tipping place where it is tipped and cleaned. The cleaning is facilitated considerably in that the screen is provided with a movable group of pins which move away from the fixed group of pins, preferably due to their own weight. The tipping operation, therefore, can be carried out very rapidly.

What I claim is:

1. A sifting screen comprising, a first and a second grating member, the elements of said first and second grating members alternating to form a substantially plane screen, link means connecting said first and second grating members to one another in a manner to prevent horizontal displacement of said elements of said gratings when said screen is in its horizontal screening position and permitting said first and second grating to move away from each other when the screen is in a predetermined vertical tipping position, and means to move said screen to said vertical tipping position, 2. A screen in accordance with claim 1 wherein the gratings are made up of a plurality of parallel pins.

3. A screen in accordance with claim 1 wherein the gratings are made up of a plurality of cross-pins.

4. A screen in accordance wtih claim 1 wherein the gratings move away from one another when the screen is in a predetermined vertical position due to the weight of one of said gratings.

5. A screen in accordance with claim 1 wherein the link means is a hinge arrangement at one side of the screen.

References Cited

UNITED STATES PATENTS

| | | | |
|---|---|---|---|
| 424,002 | 3/1890 | Jones | 209—384 X |
| 784,134 | 3/1905 | Block | 209—394 |
| 820,434 | 5/1906 | McMyler | 209—394 |
| 1,418,284 | 6/1922 | Caretto | 209—394 |
| 1,727,944 | 9/1929 | Schubert | 209—394 |
| 2,522,343 | 9/1950 | Canfield | 209—418 X |
| 2,593,359 | 4/1952 | Strehlow et al. | 209—379 X |
| 2,690,840 | 10/1954 | Kohlmier | 209—260 |
| 3,003,265 | 10/1961 | Lutjens | 209—421 X |
| 3,072,257 | 1/1963 | Hockenberry | 209—421 X |
| 3,254,767 | 6/1966 | Wehner | 209—379 X |

FOREIGN PATENTS 269,877  4/1928  Great Britain.

TIM R. MILES, Primary Examiner

U.S. Cl. X.R.

209—379, 394, 421